US009745019B2

(12) United States Patent
Evensen

(10) Patent No.: US 9,745,019 B2
(45) Date of Patent: Aug. 29, 2017

(54) BATTERY CONTAINER AND BICYCLE USING THE SAME

(71) Applicant: Mark Clifford Evensen, Tung Chung (HK)

(72) Inventor: Mark Clifford Evensen, Tung Chung (HK)

(73) Assignee: Far East Electric Bicycle Company Limited, Wanchai (HK)

( * ) Notice: Subject to any disclaimer, the term of this patent is extended or adjusted under 35 U.S.C. 154(b) by 0 days.

(21) Appl. No.: 14/852,951

(22) Filed: Sep. 14, 2015

(65) Prior Publication Data

US 2017/0073042 A1   Mar. 16, 2017

(51) Int. Cl.
*B62M 6/90* (2010.01)
*B62M 6/40* (2010.01)
*H01M 2/10* (2006.01)

(52) U.S. Cl.
CPC ............. *B62M 6/90* (2013.01); *B62M 6/40* (2013.01); *H01M 2/1077* (2013.01); *H01M 2220/20* (2013.01)

(58) Field of Classification Search
CPC ........ B62M 6/90; B62M 6/40; H01M 2/1083; H01M 2220/20
USPC ........................................... 180/220
See application file for complete search history.

(56) References Cited

U.S. PATENT DOCUMENTS

| 7,393,125 | B1 * | 7/2008 | Lai | B62M 6/90 |
| | | | | 280/281.1 |
| 7,934,576 | B2 * | 5/2011 | Munksoe | B62K 11/00 |
| | | | | 180/220 |
| 8,727,367 | B2 * | 5/2014 | Talavasek | B62K 3/02 |
| | | | | 280/274 |
| 8,789,640 | B2 * | 7/2014 | Matsuda | B62K 11/06 |
| | | | | 180/206.1 |
| 8,881,857 | B2 * | 11/2014 | Binggeli | B62M 6/90 |
| | | | | 180/206.1 |
| 8,979,110 | B2 * | 3/2015 | Talavasek | B62M 6/90 |
| | | | | 280/279 |
| 8,979,111 | B2 * | 3/2015 | Dal Pozzo | B62J 11/00 |
| | | | | 180/68.5 |
| 2006/0186158 | A1 * | 8/2006 | Ishikawa | B62J 11/00 |
| | | | | 224/419 |

(Continued)

*Primary Examiner* — Tony Winner
*Assistant Examiner* — Michael R Stabley
(74) *Attorney, Agent, or Firm* — TechMark a Law Corporation; Martin R. Greenstein

(57) ABSTRACT

A battery system assembly for a bicycle is provided. The battery system assembly includes a frame cavity liner, a first cover slideably attached to the frame cavity liner and movable between a first position and a second position with respect to the frame cavity liner, a first magnet interposed between the frame cavity liner and the first cover, a battery container configured to accommodate a rechargeable battery and having a second magnet disposed to face the first magnet, said battery container detachably attached to the frame cavity liner. When the first cover is located at the first position, the frame cavity liner and the battery container are attached one another by magnetic force between an aligned first magnet and second magnet. When the first cover is located at the second position, the first magnet and the second magnet repel each other, thereby detaching the battery container from the frame cavity liner.

10 Claims, 14 Drawing Sheets

(56) References Cited

U.S. PATENT DOCUMENTS

2009/0289063 A1* 11/2009 Fullerton ............ H04M 1/0262
                                                    220/230
2013/0176243 A1*  7/2013 BianRosa ............... G06F 3/017
                                                    345/173
2014/0042725 A1*  2/2014 Lo .............................. B62J 1/08
                                                    280/281.1

* cited by examiner

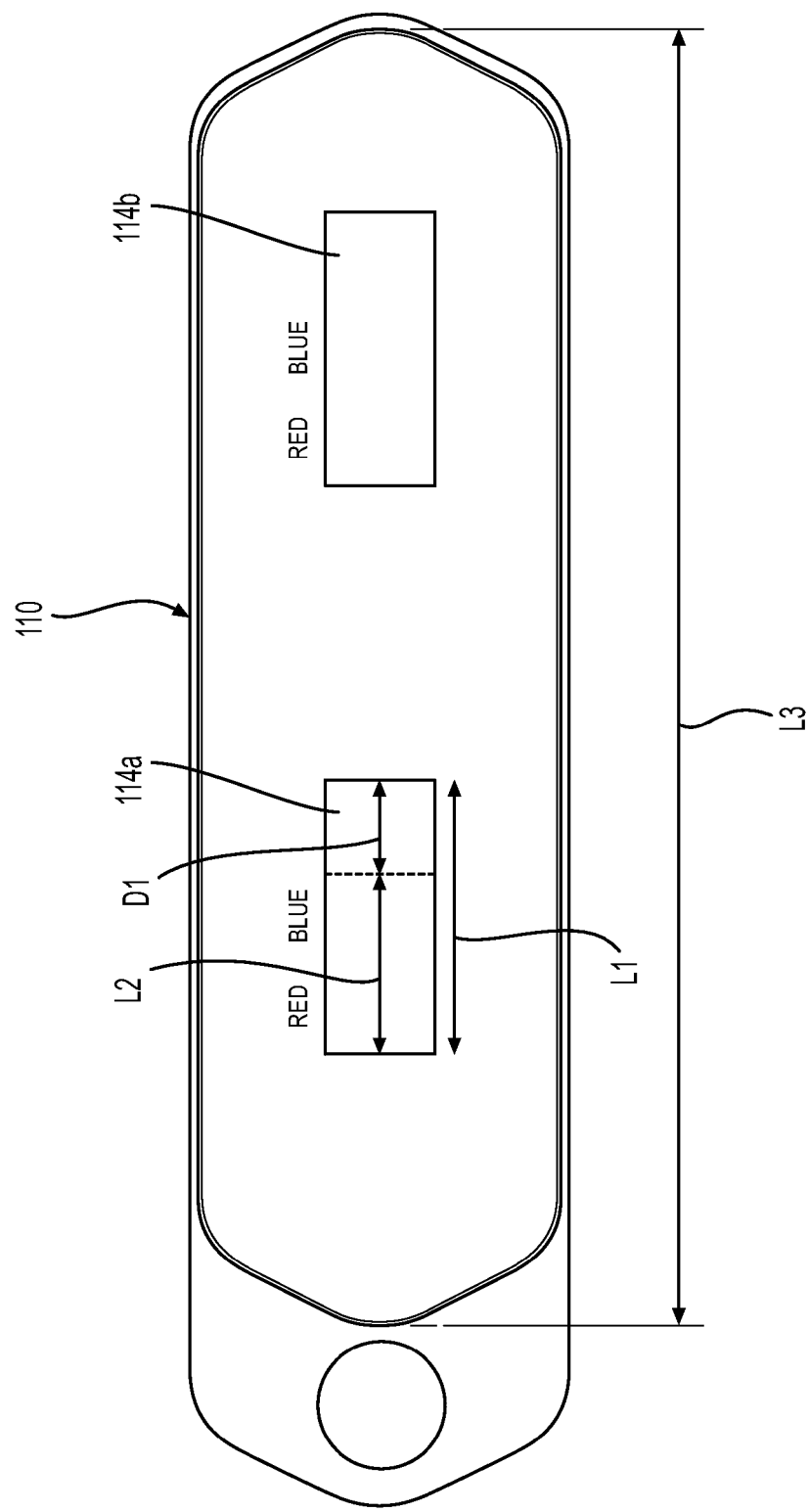

BATTERY CONTAINER AND BICYCLE USING THE SAME

FIELD OF THE INVENTION

The present disclosure relates generally to a battery container assembly and a bicycle using the same, and more particularly to a battery container assembly at least part of which is detachably attached to the bicycle to facilitate convenient recharging, e.g. inside a home or office. Such a construction also allows replacement of a discharged battery with a substitute fully charged battery.

BACKGROUND

Electric bicycles afford ecologically friendly transportation combining the health benefits of traditional bicycles with battery powered motor assistance that enables riders to travel further and faster thereby improving the utility of bicycles for more riders and circumstances. Electric bicycles are powered by small batteries that have a constrained storage capacity and thus must be periodically recharged from an electrical source. Battery charging typically requires the battery to be attached to an electrical source for many hours. To make battery charging more convenient and secure it is desirable that the battery can be detached from the bicycle so that it might be recharged. For example, the bicycle might be locked at a bicycle rack near an office, outside a home at night or in a garage where there is no conveniently located source of electricity for charging. A removable battery can be detached from the bicycle, carried inside a building where it can be charged, and then reattached to the bicycle after charging.

Generally, an electric bicycle uses a motor to drive one of the wheels on the bicycle and a battery is used to provide power to the motor. The battery is contained within a battery compartment or case that is normally mounted on the frame of the bicycle. For example, U.S. Pat. No. 7,934,576 discloses a bicycle frame that includes an electric battery located in a container or compartment that is mounted in one of a plurality chambers in the bicycle frame. At least one of the chambers has a cutout structure to receive the battery container, and at least another of the chambers has no cutout structure so as to compensate for the reduced rigidity resulting from the cutout structure.

This patent discloses a battery that is secured on only the front, back and bottom sides and is inserted into a cavity in the frame from the top, not from the sides. Thus, the battery is secured only by a three sided cavity in the bicycle frame. This prior art frame requires additional frame structure of a separate cross member and additional heavy reinforcement because the frame is vulnerable to buckling and requires a separate cross member or heavy reinforcement to compensate for the reduced strength and rigidity.

U.S. Pat. No. 7,934,576 also discloses a locking mechanism for securing a battery compartment to a bicycle frame in which a latching mechanism is required for easier access to the interior of the battery compartment to replace or charge the battery. However, a bicycle frame having a plurality of chambers as disclosed in U.S. Pat. No. 7,934,576, weakens the structural integrity of the overall bicycle and is not cost-effective to manufacture.

Thus, a new battery container structure is needed to be easily mountable onto a bicycle frame, is economical to manufacture, has rigidity to protect the battery, and that is easily accessible so that the contained batteries can be recharged.

SUMMARY OF THE DISCLOSURE

According to one embodiment of the present disclosure, a hollow battery system assembly for a bicycle is provided. The battery system assembly includes a frame cavity liner, a first cover slideably attached to the frame cavity liner and configured to be movable between a first position and a second position with respect to the frame cavity liner, a battery container that nests within the frame cavity liner and attaches magnetically thereto, and a second cover to enclose the battery container. A first magnet is interposed between the frame cavity liner and a first cover, and a second magnet is mounted in the battery container and disposed to face the first magnet when the battery container is nested within the frame cavity liner. The battery container has an internal shape configured to accommodate a battery, and is detachably attached to the frame cavity liner. When the first cover is located at a first position, the first magnet on the frame cavity liner and the magnet on the battery container are aligned and the cover is attached by magnetic force to the frame cavity liner. When the first cover is slideably moved so as to be located at a second position, the first magnet and the second magnet are not aligned and the battery container is detachable from the frame cavity liner. Each of the first magnet and the second magnet can include a set of magnets consisting of two pairs of oppositely polarized magnets, which can be aligned so that the pairs of magnets are mechanically aligned so they are mutually attracted or repulsive.

The battery system assembly in a specific embodiment further includes a sliding rail disposed on at least one of the first cover and the frame cavity liner to enable the first cover to be slid on the frame cavity liner. The battery system assembly further includes a holder disposed on at least one of the frame cavity liner and the first cover to secure the first magnet. The frame cavity liner further comprises a first cavity configured to accommodate the first magnet. The battery container further includes a second cavity configured to accommodate the second magnet. The first magnet preferably has substantially the same size as the second magnet. The first magnet and the second magnet can include two pairs of magnets having similar size and mechanical assignment. The first cavity has a first cavity length and the second cavity has a second cavity length. The first cavity length is greater than the second cavity length so that the first magnet is able to slide in the first cavity.

In a further specific embodiment of the disclosure, the first cover has a first cover length and the frame cavity liner has a frame cavity liner length. The first cover length is greater than the frame cavity liner length. The length of the first cover and the length of the frame cavity liner is equal to a cavity difference value between the first cavity length and the second cavity length. The battery container has a first side and a second side, where the first side has cavities. The second magnet is disposed within the battery container through an opening on the first side.

The battery system assembly further includes a second cover disposed on the first side of the battery container. At least one of the first cover and the second cover has an uneven surface. The frame cavity liner further includes at least one rib attached on a surface of the frame cavity liner configured to hold the battery container. The frame cavity liner, first cover, battery container, and second cover are made of a non-conductive material.

According to another embodiment of the present disclosure, it comprises a bicycle having a frame, and a battery system assembly mounted within the bicycle frame. The bicycle includes a wheel, a pedal, a chain coupled between the wheel and the pedal, and a motor coupled to the wheel for driving the wheel. The battery system assembly comprises a frame cavity liner and a first cover slideably attached to the frame cavity liner and movable between a first position and a second position with respect to the frame cavity liner, a battery container that nests within the frame cavity liner and attaches magnetically thereto, and a second cover to enclose the battery container. A first magnet is mounted so as to be interposed between the frame cavity liner and the first cover, and a second magnet is mounted in the battery container facing the first magnet in a first position. In this first position, the first cover is securely mounted thereby securely mounting the battery container to the frame cavity liner. In a second position, the first cover is removable and access to the contained battery is enabled.

The battery container has a battery mounted therein, and is detachably attached to the frame cavity liner. A body frame of the bicycle has a through-hole, and a handle of a bicycle rotatably attached to the body frame. The body frame includes a motor, a wheel, a pedal, and a chain operably mounted thereon. The frame cavity liner is rigidly attached with a nut and bolt assembly extending through the through-hole. When the first cover is located at the first position, the frame cavity liner and the battery container are attached to one another by the magnetic force between the first magnet and the second magnet. When the first cover is located at the second position, the first magnet and the second magnet are misaligned and easily separable so as to permit the detaching of the battery container from the frame cavity liner. When the first cover is in the second position, the first and second magnets repel each other assisting the process of detaching the battery container from the frame cavity liner.

BRIEF DESCRIPTION OF THE DRAWINGS

FIG. 4D is a top view of the frame cavity liner according to the present disclosure;

DETAILED DESCRIPTION

Figure 1:
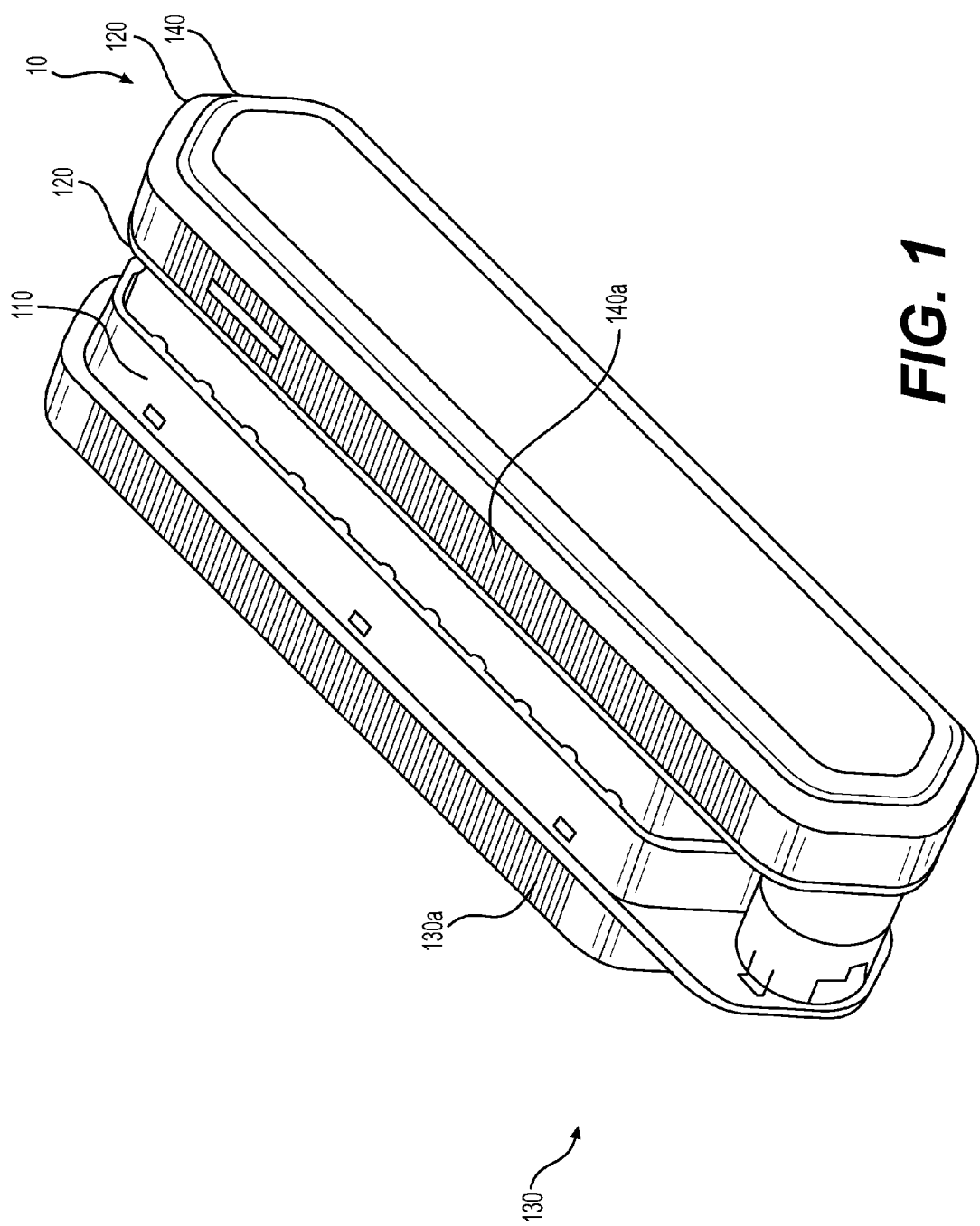
FIG. 1 is a prospective view of a battery container assembly according to an embodiment of the present disclosure.

Reference is now made to the accompanying drawings which illustrate in detail examples of embodiments of the present disclosure, wherein like reference numerals refer to like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like are be used to describe various elements, but do not limit the number of elements. Such terms are only used to distinguish one element from another.

Figure 8:
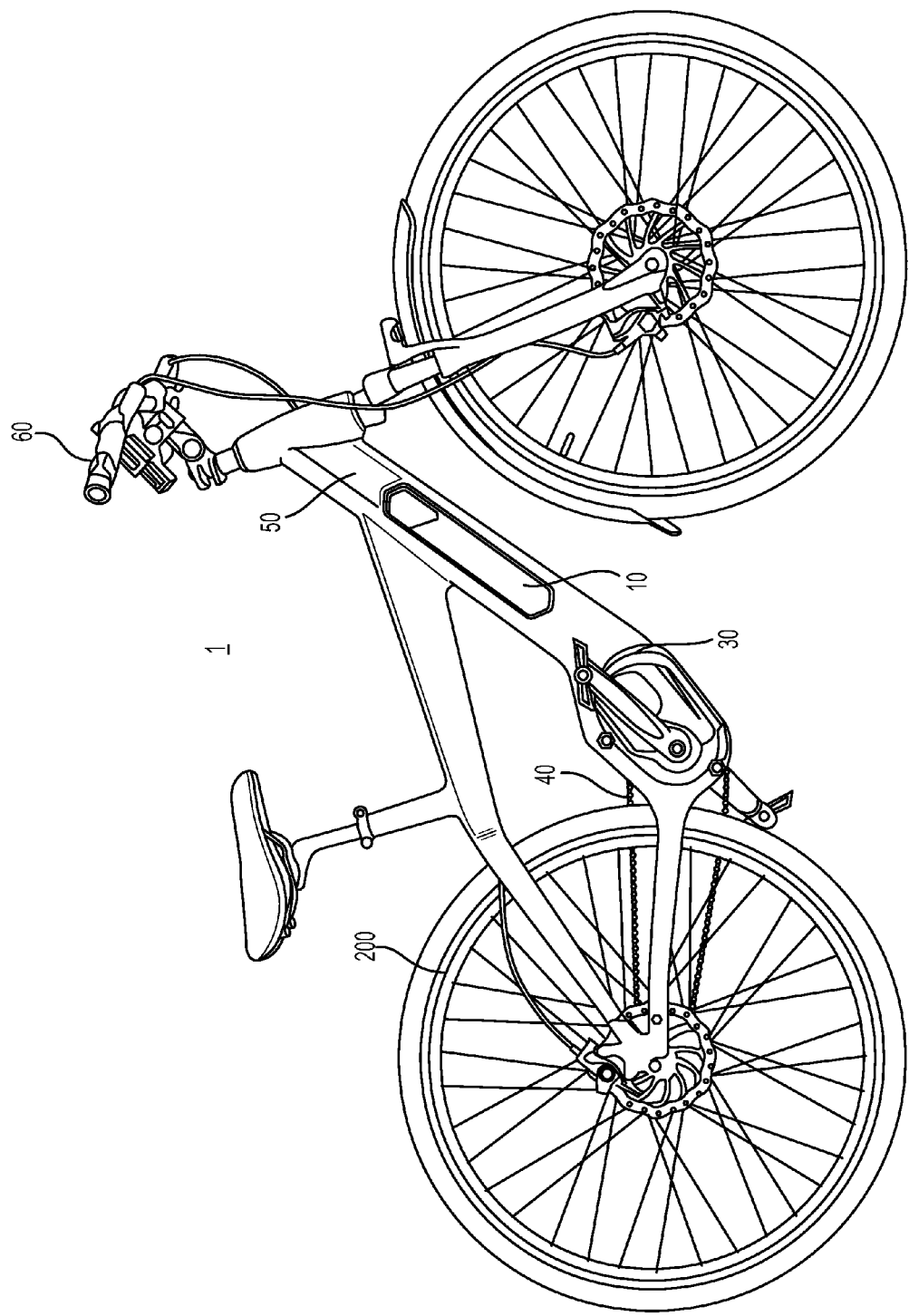
FIG. 8 is a side view of a bicycle containing a battery system assembly according to another embodiment of the present disclosure.
Figure 9:
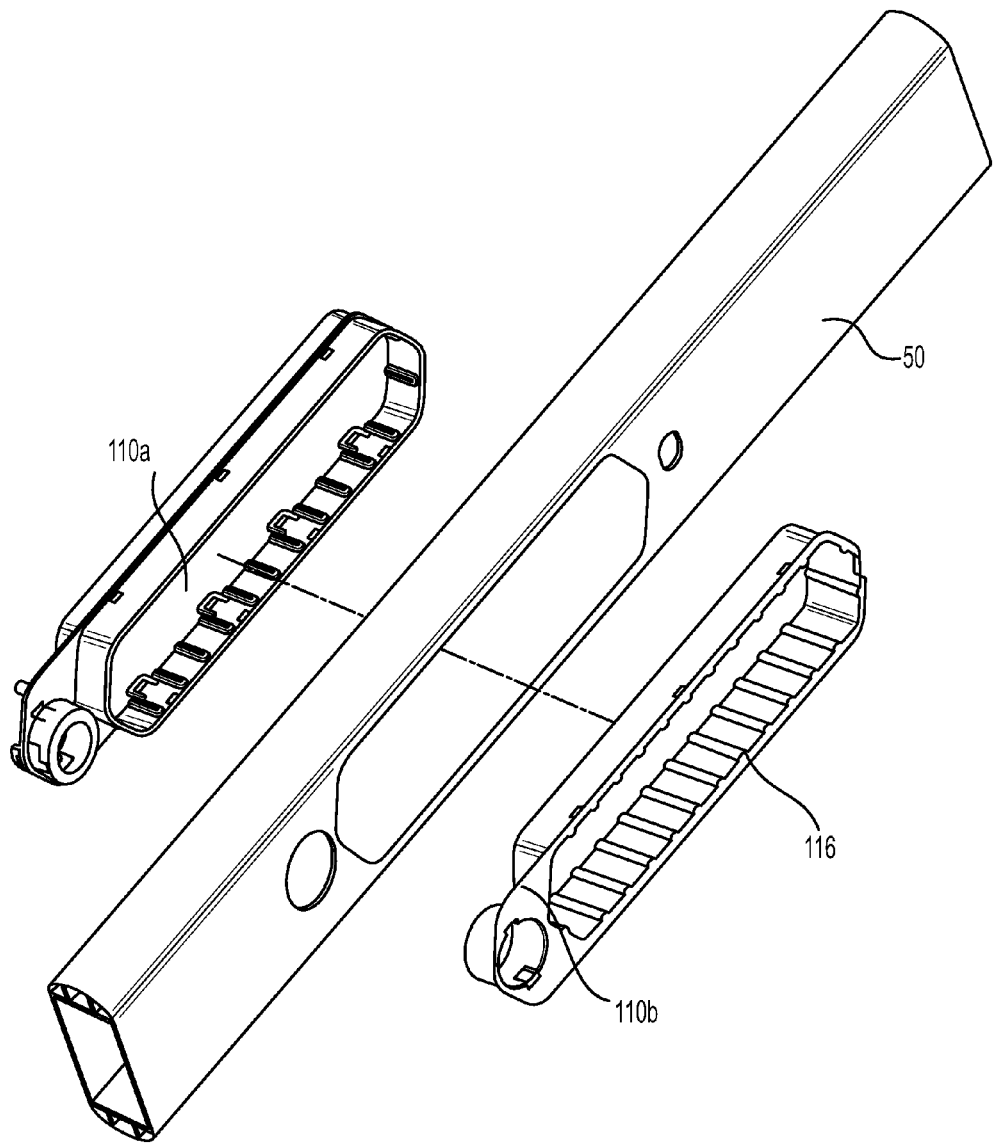
FIG. 9 is an exploded view of the frame cavity liner assembly according to another embodiment of the present disclosure.

According to the present disclosure, as depicted in FIGS. 1 and 8, a bicycle 1 having a frame 2 has a battery system assembly 10 disclosed mounted in frame 2 on bicycle 1. Battery system assembly 10 contains a plurality of secondary battery cells (not shown in these figures) and a battery management system (not shown). The battery management system is an electronic component designed for safe charging or discharging of the secondary battery cells. The battery management system is provided to extend the secondary battery cell's usable lifespan through a balancing technology that is not part of the present disclosure, but would be obvious to those skilled in the art. Battery system assembly 10 is rigidly attached within the frame of bicycle 1 as depicted in FIGS. 8 and 9, and as described more fully hereinafter.

Figure 2:
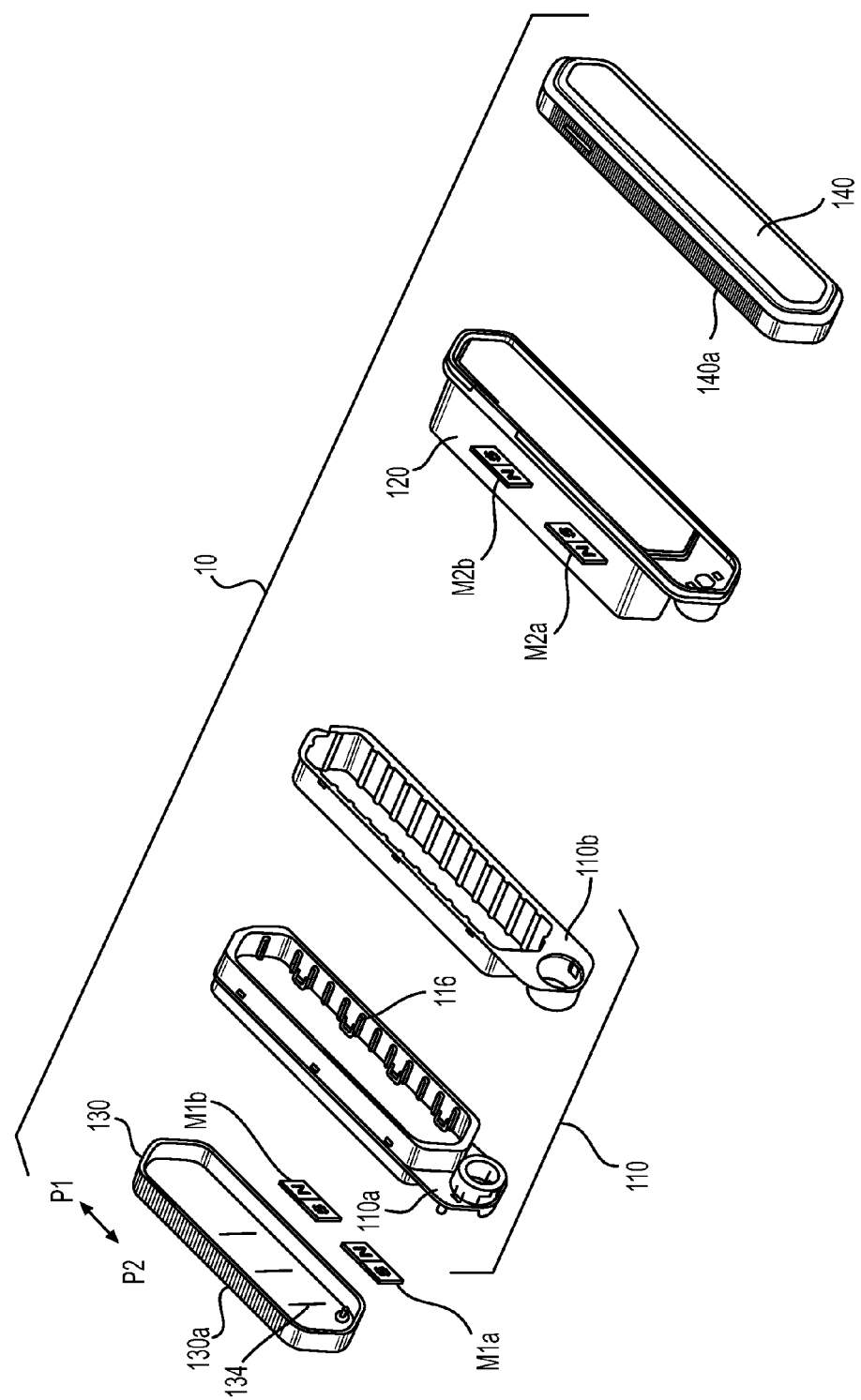
FIG. 2 is an exploded perspective view of the battery container assembly taken from one side according to the embodiment of the present disclosure.

With reference in particular to FIG. 1 and also to FIG. 2, battery system assembly 10 includes a frame cavity liner 110, a battery container 120, a first cover 130, and a second cover 140. As exemplarily depicted in FIG. 2, a first set of magnets M1a and M1b is interposed between frame cavity liner 110 and first cover 130. A second set of magnets M2a and M2b is attached in battery container 120. First cover 130 is slideably attached to frame cavity liner 110. Second cover 140 is detachably attached to battery container 120. Frame cavity liner 110 is attached to bicycle 1, as described in greater detail hereinbelow. Battery container 120 is detachably attached to frame cavity liner 110. Thus, secondary battery cells can be accessed and replaced or charged, by detaching second cover 140 from battery container 120. The battery container can then be removed from frame cavity liner 110.

According to the presently preferred disclosure, first cover 130 is slideably mounted on frame cavity liner 110. A pair of magnet sets, a first magnet set comprised of first magnets M1a and M1b, and a second magnet set comprised of second magnets M2a and M2b, permits the attachment and/or detachment between frame cavity liner 110 and battery container 120. The latching mechanism between frame cavity liner 110 and battery container 120 is described below with reference to FIGS. 3A-3C. Each element of battery container assembly 10 is described further hereinafter.

Figure 3A:
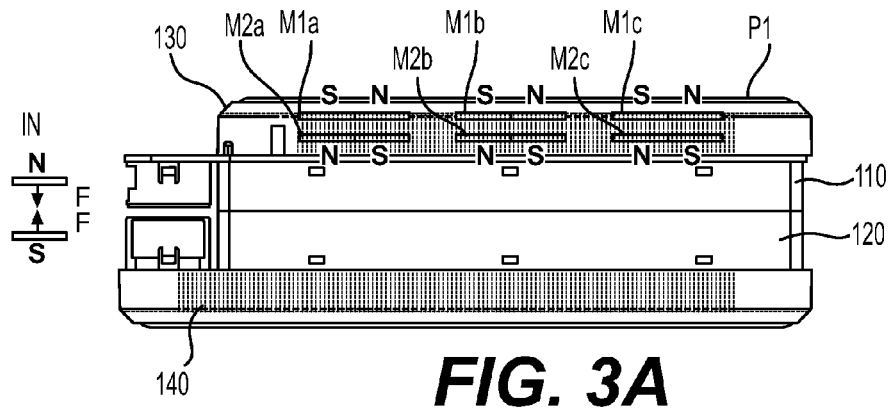
FIGS. 3A-3C are simplified schematic diagrams depicting the attachment and detachment between a frame cavity liner and a battery container.
Figure 3B:
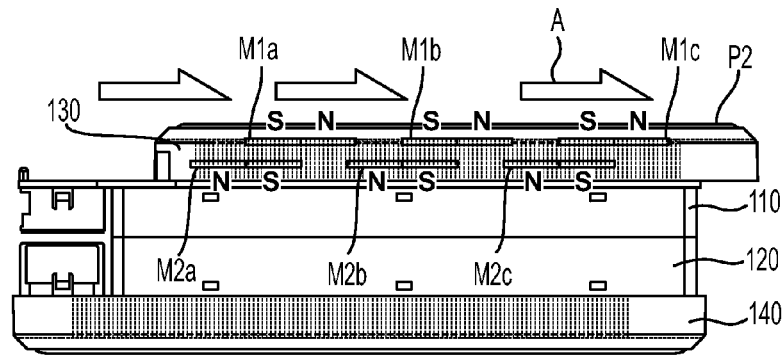
Figure 3C:
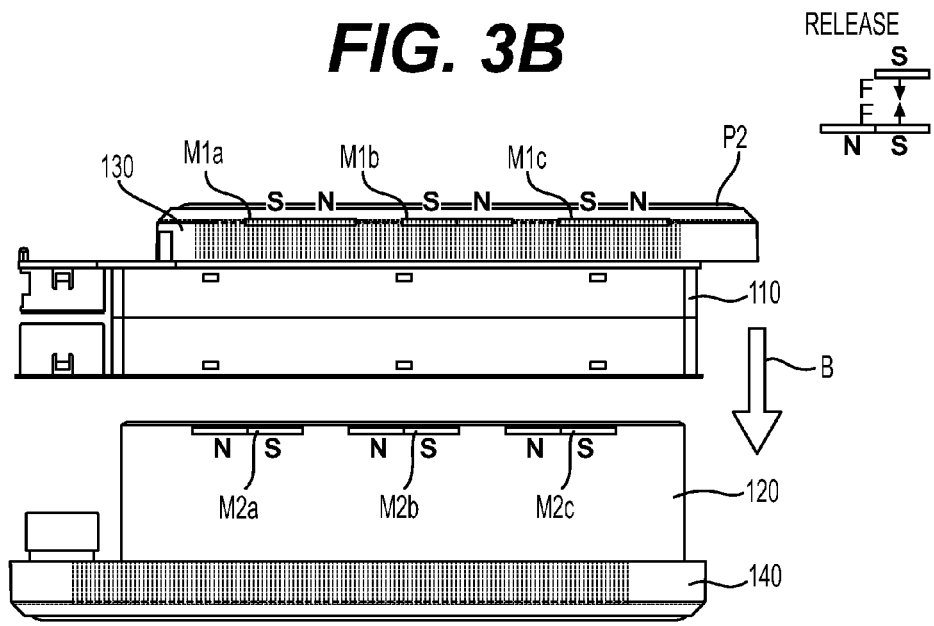

With particular reference now to FIGS. 3A-3C, the attachment and detachment between frame cavity liner 110 and battery container 120 is described. Each of the depicted first magnets M1a, M1b and M1c and second magnets M2a, M2b and M2c can be comprised of a plurality of magnets, but are depicted for simplicity as only two magnets. FIG. 2 depicts that each of first magnet M1a and M1b and second magnet M2a and M2b have two (2) magnet parts. Each of first magnet M1a and M1b and second magnet M2a and M2b is configured to include two oppositely polarized magnets. FIGS. 3A-3C depict that each of first magnets M1a, M1b and M1c and second magnets M2a, M2b and M2c have three (3) magnet parts. Certainly, the magnet parts could just be one large magnet. However, the number of magnets is provided for exemplary purpose only and is not meant to limit the number of magnet parts.

For exemplary purpose only, a permanent bar magnet is illustrated in FIGS. 3A-3C but is not meant to be a limit thereof. Any type of magnet can be used, e.g., temporary, permanent, and electromagnets, and the magnet can have any shape, e.g., circular, donut, and horse shoe. Further, the magnets can have various sizes in length, width and thickness, as appropriate, provided that the magnets can be configured with a polarization that is orthogonal to the direction of travel of the slideable first cover 130 as depicted in FIGS. 3A and 3B.

As mentioned above, first and second magnets have negative and positive poles. It is known that same type of pole of magnets repel each other and opposite types of poles of magnets attract each other. First magnets M1a, M1b and M1c are secured in first cover 130 and second magnets M2a, M2b and M2c are attached to battery container 120. FIG. 3A depicts a first position P1 of the relationship between first cover 130 and battery container 120 within battery system 10. FIGS. 3B and 3C depict a second position P2 of the relationship between first cover 130 and battery container 120 within battery system 10.

Figure 4A:
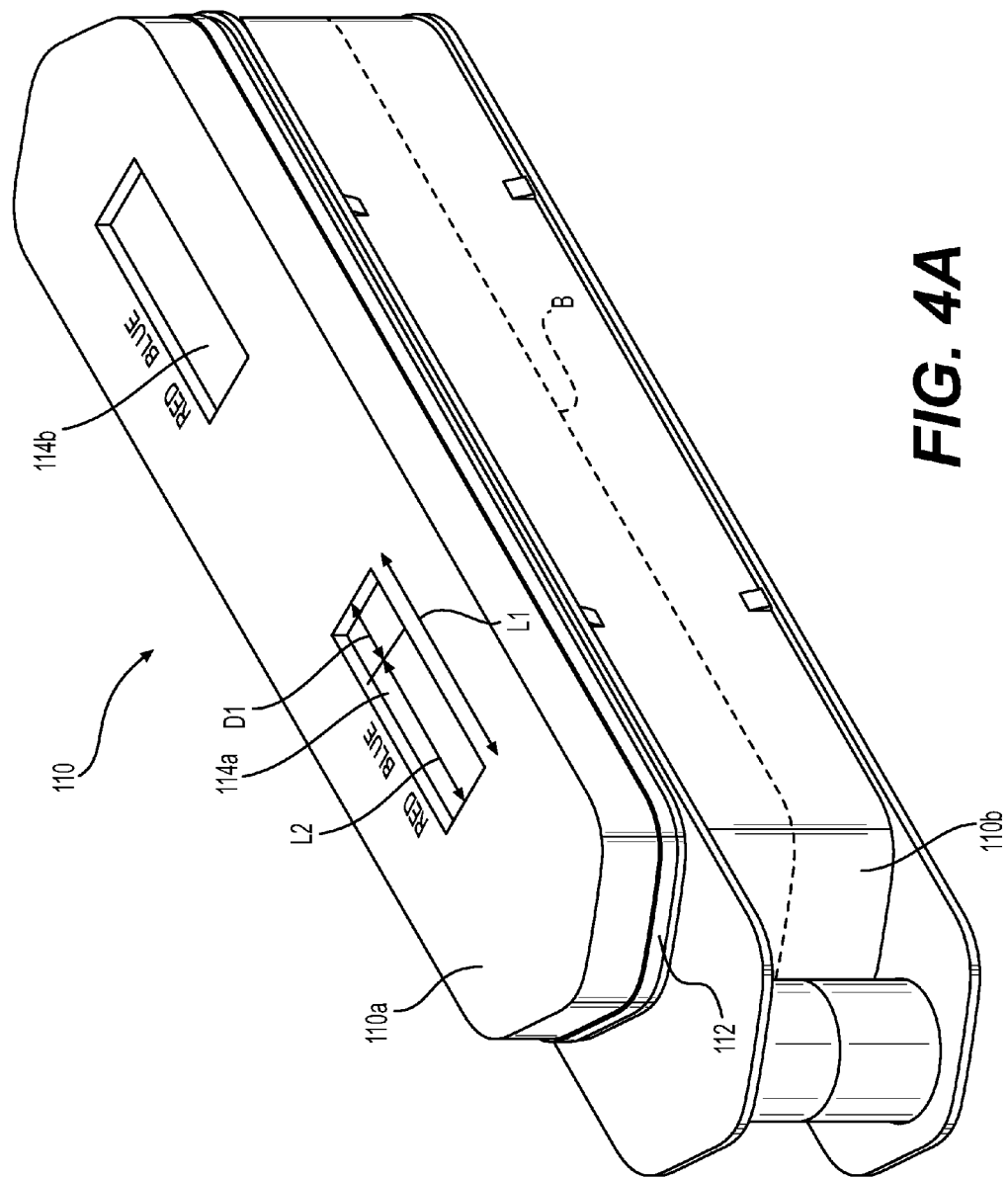
FIG. 4A is a perspective view of the frame cavity liner taken from one side according to the present disclosure.

First cover 130 is configured to slide reciprocally on sliding rail 112, shown in FIG. 4A, on frame cavity liner 110 between a first position P1 and a second position P2 as shown by arrow A in FIG. 3B. When first cover 130 is located at first position P1, frame cavity liner 110 and battery container 120 are retained mounted on one another by a magnetic attraction force existing respectively between first magnets M1a, M1b and M1c and second magnets M2a, M2b and M2c. When first cover 130 is located at second position P2, first magnets M1a and M1s and second magnets M2a and M2b are now in a position such that the same polarities of the magnets are opposite each other resulting in detaching a detaching force that urges battery container 120 away from frame cavity liner 110 along an arrow B as shown in FIG. 3C.

With reference to FIGS. 4A-4D, frame cavity liner 110 will be described. Frame cavity liner 110 has an oblong shape with an outer wall that defines an inner cavity or opening. Frame cavity liner 110 has through holes at each end that permit it to be attached to bicycle frame 50, as shown in FIG. 9. Frame cavity liner 110 provides a structure on which first cover 130 can reciprocally slide.

Frame cavity liner 110 has an opening for accommodating battery container 120 therein. Frame cavity liner 110 has two elongate cavities extending along part of the length thereof, namely cavities 114a and 114b. Cavities 114a and 114b have dimensions of length, width and depth so as to be configured to accommodate first and second sets of magnets M1a and M1b, respectively. First cavity 114a and 114b has length so that first magnet M1a and M1b can move from side to side. First magnets M1a and M1b can slide in and along first cavity 114a and 114b as first cover 130 moves back and forth. When first magnet M1a and M1b is aligned with opposite charge of second magnet M2a and M2b in battery container 120, a latching system is locked. When first magnet M1a and M1b slides the other way as frame cavity liner 110 slides, first magnets M1a and M1b become unaligned with second magnets M2a and M2b in battery container 120. The common polarities of the magnets will now be opposite each other thereby urging battery container 120 out of frame cavity liner 110 due to the magnetic force.

Figure 4B:
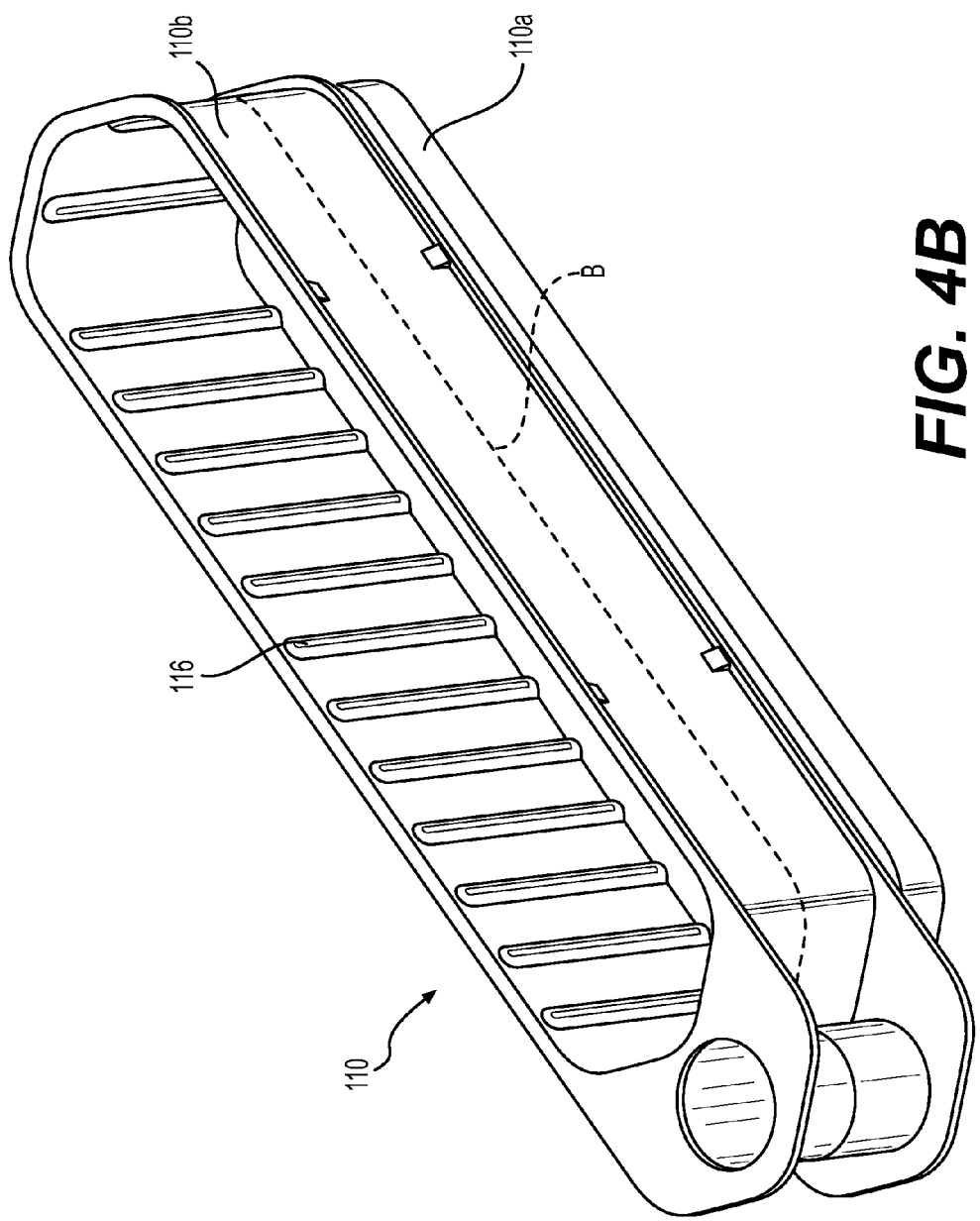
FIG. 4B is a perspective view of the frame cavity liner taken from the other side according to the present disclosure.

Frame cavity liner 110 has a plurality of vertical ribs 116 as shown in FIG. 4B, located on the inner surface of frame cavity liner 110. Ribs 116 are configured to engage battery container 120 and retain it in frame cavity liner 110. Thus, battery container 120 is detachably nested inside the cavity of frame cavity liner 110, with ribs 116 providing supports to battery container 120 as a result of the friction there between. Ribs 116 in addition increase the strength of frame cavity liner 110 and resist against a deformation of frame cavity liner 110, such as might occur should secondary battery cells in battery container 120 become swollen.

Figure 4C:
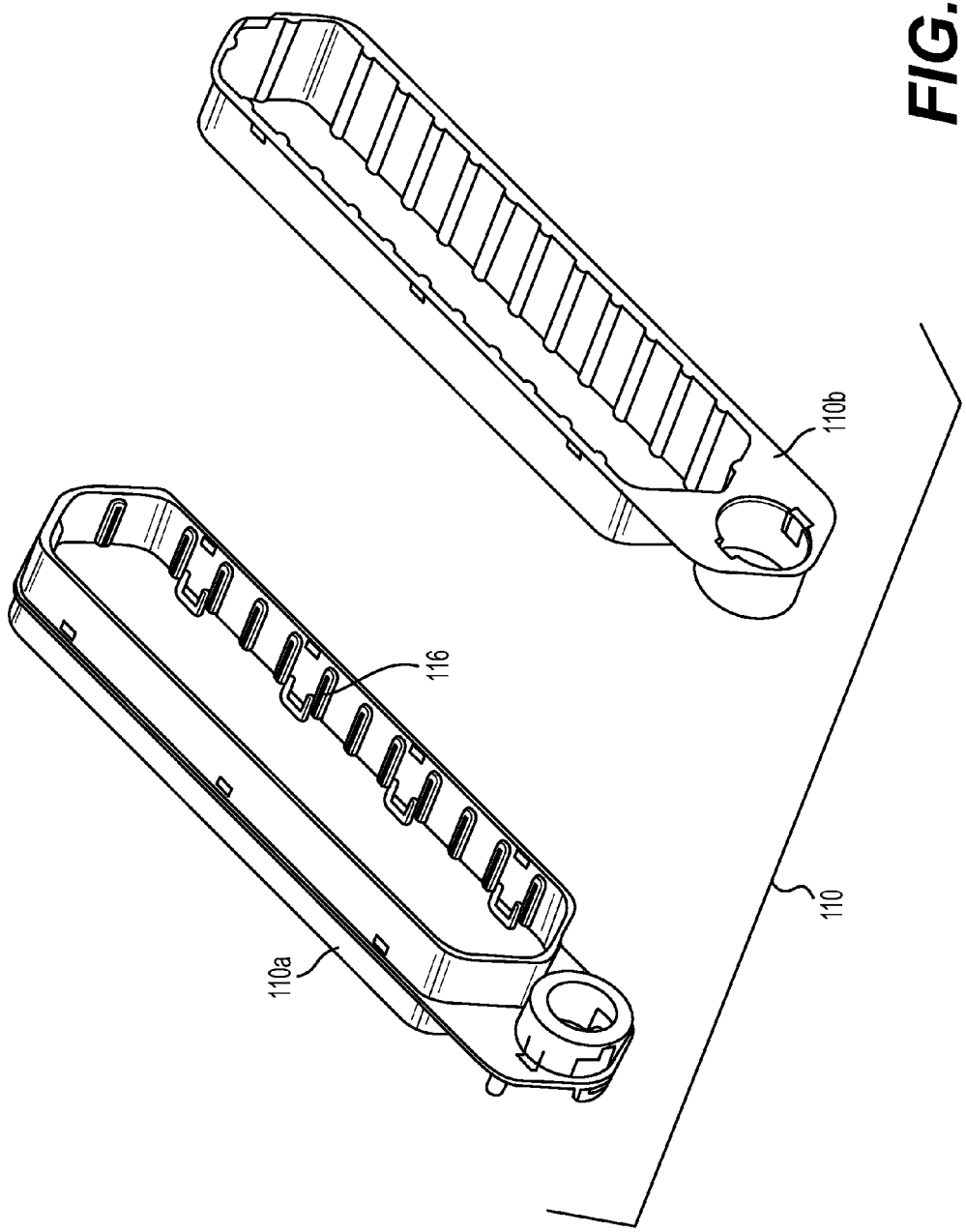
FIG. 4C is an exploded perspective view of the frame cavity liner according to the present disclosure.

Frame cavity liner 110 can be permanently installed into the body frame of the bicycle 1. FIG. 4A depicts frame cavity liner 110 as a single integrated structure. However, as depicted in FIG. 4C, frame cavity liner 110 can be comprised of a plurality of components, such as two. For instance, frame cavity liner 110 can be comprised of two pieces defined by a dashed line A in FIGS. 4A and 4B, and thus separated into two pieces. Thus frame cavity liner 110 can include a two pieces, a first frame cavity liner 110a and a second frame cavity liner 110b.

With reference to FIG. 9, first frame cavity liner 110a is inserted from one side of a bicycle body frame member 50 of frame 2 and second frame cavity liner 110b is inserted from the other side of body frame member 50. In this manner, the two halves of frame cavity liner 110a and 110b can be assembled on opposing sides of bicycle body frame 50 with a coupling means that includes, but is not limited to attaching with a nut and bolt combination and by welding.

FIG. 4D is a top view of the frame cavity liner and depicts that first cavity 114a and 114b has a first cavity length L1 and frame cavity liner 110 has a frame cavity liner length L3.

Figure 5A:
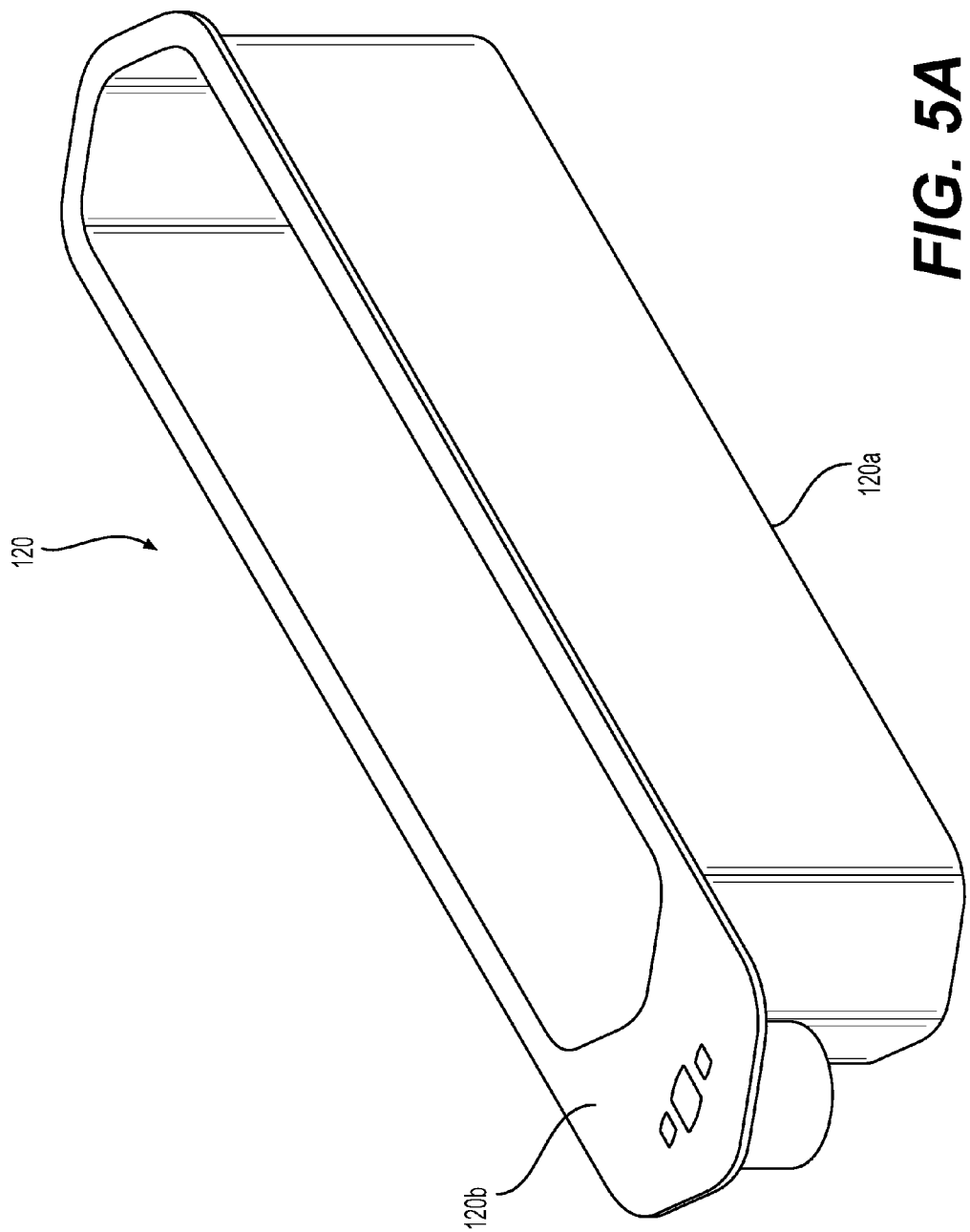
FIG. 5A is a perspective view of the battery container taken from one side according to the present disclosure.
Figure 5B:
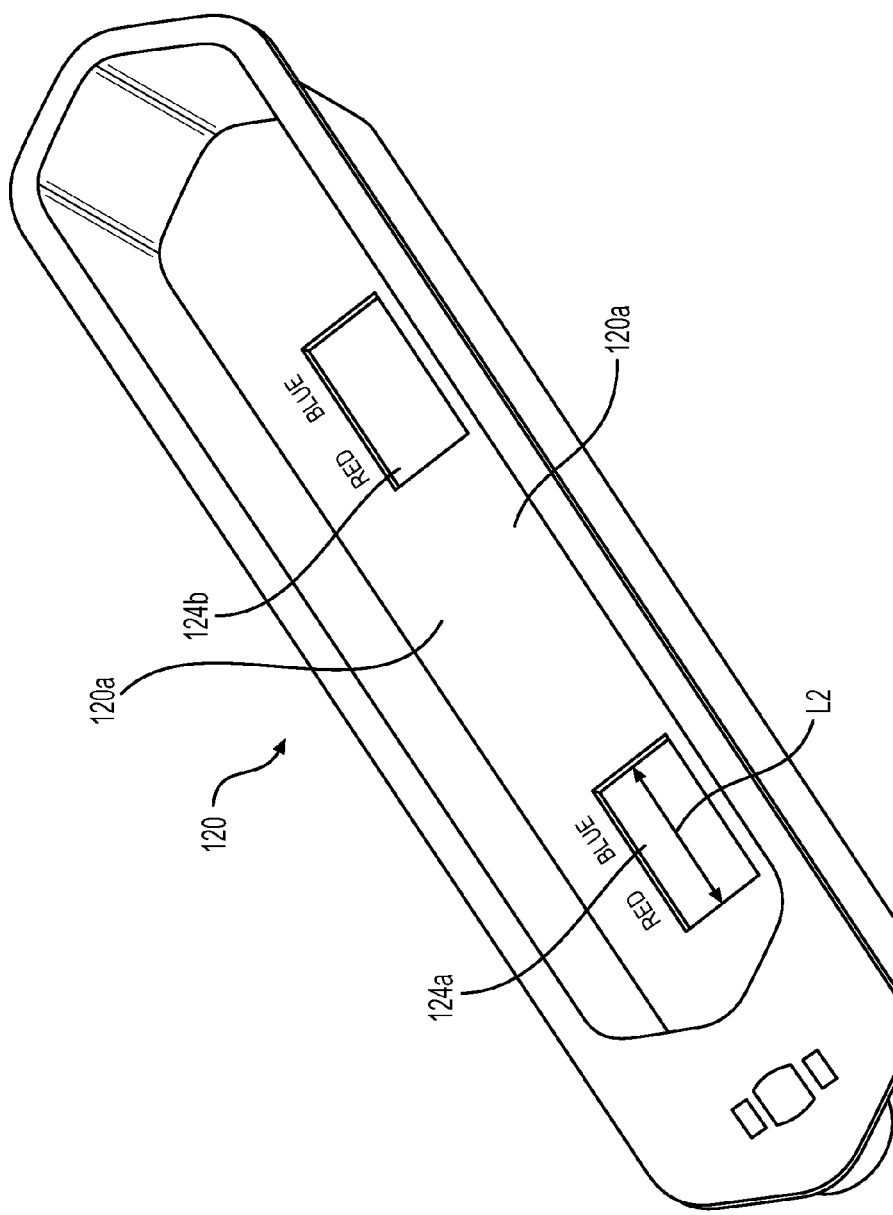
FIG. 5B is a perspective view of the battery container taken from the other side according to the present disclosure.
Figure 5C:
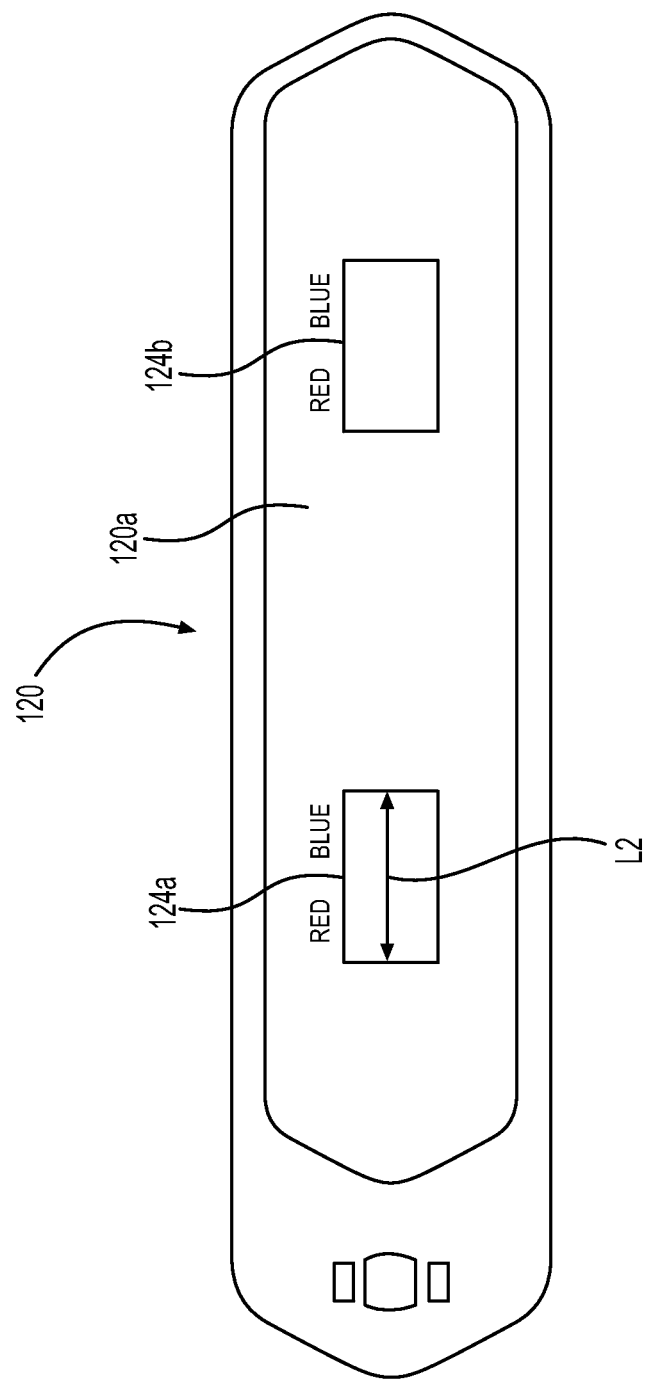
FIG. 5C is a bottom view of the battery container according to the present disclosure.

With reference to FIGS. 5A, 5B, and 5C, battery container 120 will be described. Battery container 120 has an oblong shape with a flared top and has a cavity inside. The inside of battery container 120 includes a plurality of secondary battery cells and an electronic device (not shown in these figures). Battery container 120 has dimensions of a length, width and depth and an overall external shape so that it can be inserted into the cavity of frame cavity liner 110. Battery container 120 has a first side 120a and a second side 120b. Second magnets M2a and M2b are disposed and attached inside first side 120a. Second set of magnets M2a and M2b are disposed inside battery container 120 such that they are opposite first magnet M1a and M1b. As shown in FIG. 3A, frame cavity liner 110 and battery container 120 are located between first magnet set of magnets M1a and M1b and second magnet set of magnets M2a and M2b.

With reference to FIG. 5B, second cavity 124a and 124b can be formed on the first side 120a of battery container 120. Second cavity 124a and 124b is configured to secure second magnet M2a and M2b respectively. Second cavity 124a and 124b has a second cavity length L2 and a size which fits to a size of second magnet M2a and M2b so that second magnets M2a and M2b cannot slide within the second cavity 124a and 124b. Furthermore, according to another embodiment of the present disclosure, second magnets M2a and M2b are permanently attached to first side 120a and thus do not slide on first side 120a. For instance, second magnets M2a and M2b can be glued to battery container 120. Second side 120b of battery container 120 has an opening for accommodating the array of secondary battery cells therein (not shown).

With reference to FIG. 4D, first cavities 114a and 114b have a first cavity length L1 and with reference FIG. 5C, second cavities 124a and 124b have a second cavity length L2. Second cavity length L2 is be equal to a longitudinal length of second magnets M2a and M2b. First cavity length L1 is greater than second cavity length L2 by a length D1 so that the first set of first magnets M1a and M1b are permitted to slide in first cavity 114a and 114b as first cover 130 moves from first position P1 to second position P2 as shown in FIGS. 3A and 3B. However, second magnets M2a and M2b are rigidly mounted on first side 120a of battery container 120a. A cavity length difference D1 has a value between first cavity length L1 and second cavity length L2. First cover 130 can travel for cavity length difference value D1. For example, cavity difference value D1 can be equal to a half of second cavity length L2.

Figure 6:
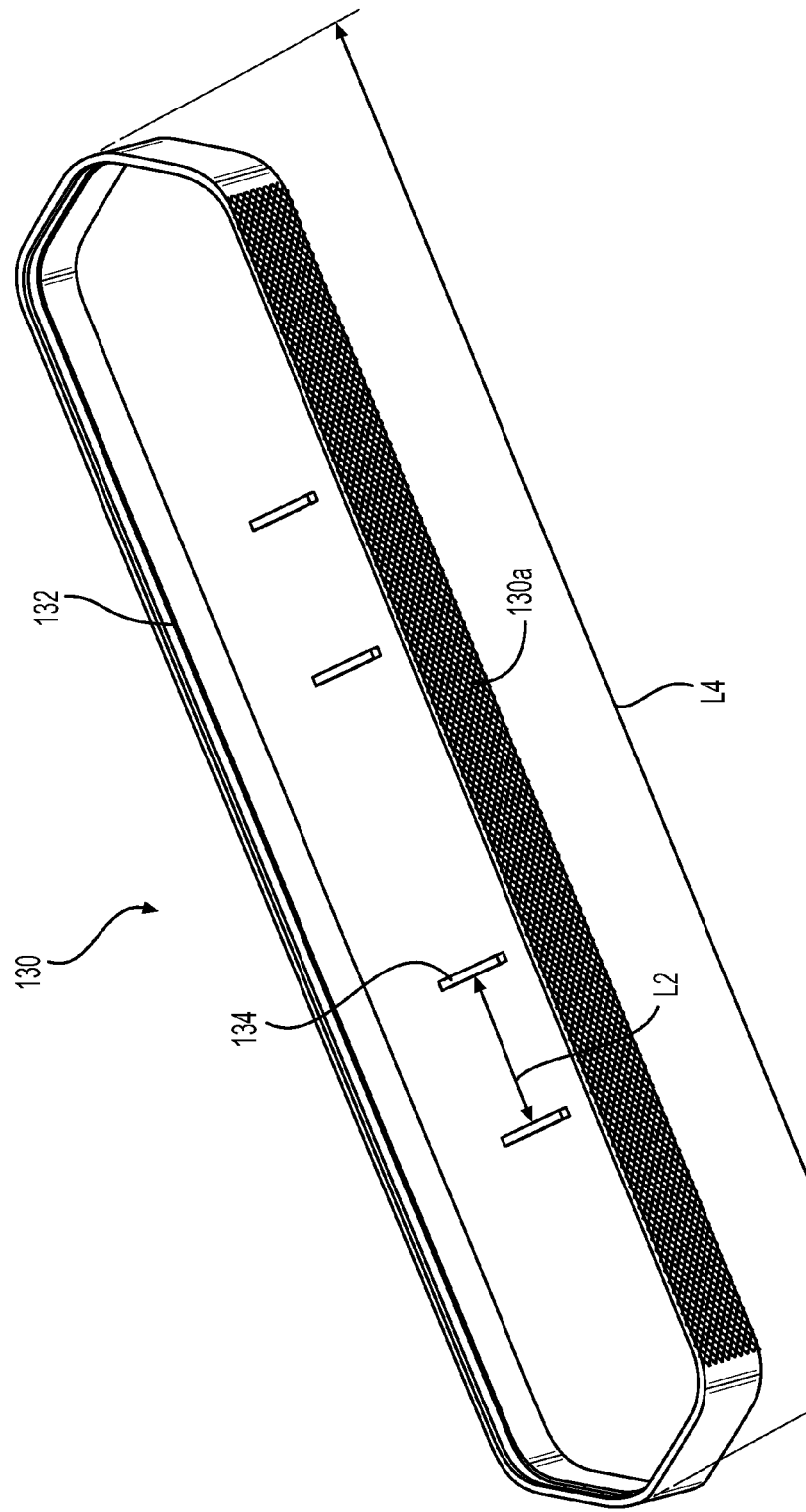
FIG. 6 is a perspective view of a first cover.

With reference to FIG. 6, first cover 130 will now be described. First cover 130 is longitudinal with a base and upstanding sides so as to define an interior space. At least an exterior portion of the surface of first cover 130 has an uneven or gnarled portion 130a to permit manual grasping and moving of first cover 130.

First cover 130 is slideably attached to frame cavity liner 110 and moveable between a first position P1 and a second position P2 with respect to frame cavity liner 110 as depicted in FIG. 2 and FIGS. 3A and 3B. Frame cavity liner 110 has a frame sliding rail 112 located thereon (see FIG. 4A) and first cover 130 has a corresponding cover sliding rail 132 located on the inside thereof so as to permit first cover 130 to slide on frame cavity liner.

First cover 130 has a pair of spaced apart holders located on the inside thereof for securing first set of magnets M1a and M1b thereto. The distance between the components of holder 134 is substantially the same distance as second cavity length L2 as depicted in FIG. 6. The first set of magnets, first magnets M1a and M1b, have substantially the same size as the second set of second magnets M2a and M2b, which length is equal to second cavity length L2. Holder 134 secures the first set of first magnets M1a and M1b. and as first cover 130 moves, holder 134 ensures that first magnet M1a and M1b move together with first cover 130. According to another embodiment of the present disclosure, first magnet M1a and M1b can be fixedly attached to first cover 130, such as by an adhesive.

With reference to FIGS. 4D and 6, frame cavity liner 110 has a frame cavity liner length L3 and first cover 130 has a first cover length L4. First cover length L4 is greater than frame cavity liner length L3 so that first cover 130 has enough space to slide on frame cavity liner 110. The cover difference value between frame cavity liner length L3 and first cover length L4 can be substantially equal to cavity difference value D1 between first cavity length L1 and second cavity length L2.

Figure 7:
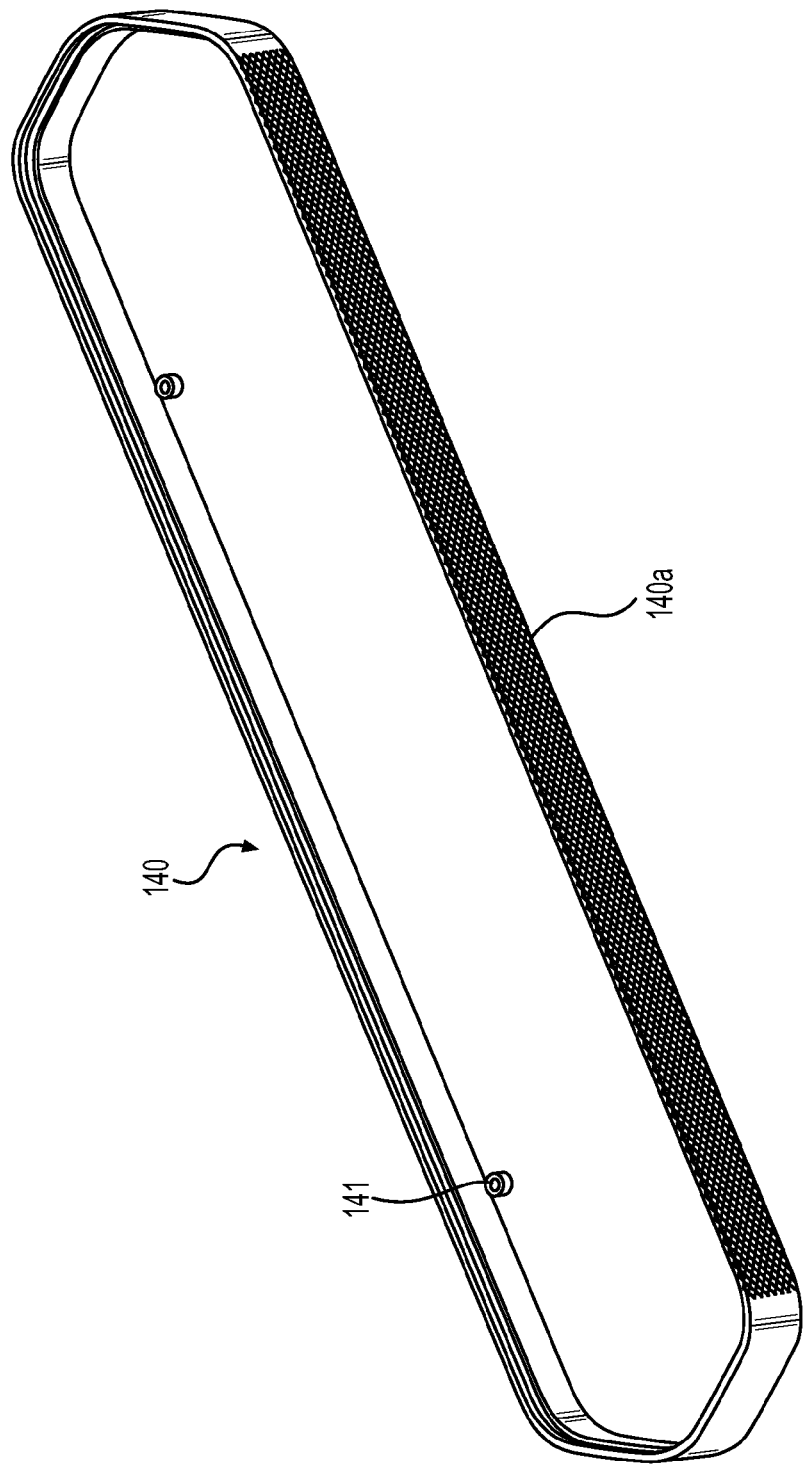
FIG. 7 is a perspective view of a second cover.

With reference to FIG. 7, second cover 140 will be described. Second cover 140 is disposed on second side 120b of battery container 120 (see FIG. 5A). Second cover 140 is longitudinal with a base and upstanding sides so as to define an interior space. At least a portion of second cover 140 has a second uneven or gnarled surface 140a on the outer surface of the upstanding sides so as to provide a better grip when removing or inserting battery container 120. Second cover 140 encloses the battery container 120 to ensure that the secondary battery cells (not shown) and a battery management system (not shown) in battery container 120 are safely enclosed and safe from the elements of the environment, such as humidity and moisture. Second cover 140 provides a water tight enclosure and protection for the secondary battery cells and the battery management system from damage. The interior of second cover 140 has a plurality of mounting posts 141 that allows for attachment of the battery management system (not shown).

Frame cavity liner 110, battery container 120, first cover 130, and second cover 140 are made of a non-conductive material and non-corrosive material, such as a hard plastic.

With reference to FIG. 8 bicycle 1 having a battery container assembly 10 mounted on it, according to another embodiment of the present disclosure. Bicycle 1 includes battery system assembly 10, front and rear wheels 20, a pedal 30, a chain 40, a motor (not shown), a body frame 50, and handle bars 60, which is rotatably attached to body frame 50.

Chain 40 is coupled between rear wheel 20 and pedal 30 in a conventional manner. Motor (not shown) is coupled to wheel 20. Battery system assembly 10 is inserted into body frame 50 as depicted in FIG. 9. Body frame 50 has an opening in both sides thereof. The opening has a size, length, height, and shape so as to accommodate battery container assembly 10. The size and shape of body frame 50 opening completely surrounds and tightly contains battery container assembly 10 on all of its peripheral sides. This arrangement provides structural integrity to body frame 50 and extra protection to battery system assembly 10. For example, battery system assembly 10 has an elongated shape and is completely surrounded by body frame 50 as depicted in FIGS. 8 and 9. At the same time, battery system assembly 10 is exposed on both sides of body frame 50, which are the right and left sides for a rider. This embodiment overcomes the disadvantages described hereinabove with respect to U.S. Pat. No. 7,934,576.

In contrast to this prior art, the embodiment according to the present disclosure provides more rigidity to the body frame 50 because it maintains the exterior frame of the bicycle 1 and to the battery system assembly 10 because bicycle frame structural members surround the edges thereof.

As described above, frame cavity liner 110 can be permanently attached to body frame 50. Battery container 120 can be removed from frame cavity liner 110 by opening the liner for providing access to the batteries. Frame cavity liner 110 can be made of metal e.g., aluminum, or plastic and can be permanently welded/glued or removably attached by bolts and nuts into body frame 50. Battery container 120 and second cover 140 completely encloses the secondary battery cells.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

What is claimed is:

1. A battery system assembly for a bicycle, the battery system assembly comprising:

a frame cavity liner;
a first cover slideably attached to the frame cavity liner and movable between a first position and a second position with respect to the frame cavity liner;
a first magnet interposed between the frame cavity liner and the first cover;
a battery container assembly configured to accommodate a rechargeable battery and having a second magnet disposed to face the first magnet, said battery container assembly detachably attached to the frame cavity liner; and
a sliding rail disposed on at least one of the first cover and the frame cavity liner so that the first cover can slide on the frame cavity liner;
wherein, when the first cover is located at the first position, the frame cavity liner and the battery container are attached one another by magnetic force between the first magnet and the second magnet; and
wherein, when the first cover is located at the second position, the first magnet and the second magnet are arranged to face same polarities of one another for urging the battery container to be detached from the frame cavity liner.

2. The battery system assembly as claimed in claim 1, wherein the battery container assembly further comprises a holder disposed on at least one of the frame cavity liner and the first cover to secure the first magnet.

3. The battery system assembly as claimed in claim 1, wherein the frame cavity liner has an inner surface and an outer surface, said battery system assembly further comprising at least one rib attached on an inner surface of the frame cavity liner so as to hold the battery container therein.

4. The battery system assembly as claimed in claim 1, wherein the frame cavity liner, first cover, battery container, and second cover are made of a non-conductive material.

5. A battery system assembly for a bicycle, the battery system assembly comprising:
a frame cavity liner;
a first cover slideably attached to the frame cavity liner and movable between a first position and a second position with respect to the frame cavity liner;
a first magnet interposed between the frame cavity liner and the first cover;
a battery container assembly configured to accommodate a rechargeable battery and having a second magnet disposed to face the first magnet, said battery container assembly detachably attached to the frame cavity liner;
wherein the frame cavity liner further comprises a first cavity configured to accommodate the first magnet, and wherein the battery container assembly further comprises a second cavity configured to accommodate the second magnet, wherein the first magnet has substantially the same size as the second magnet, wherein the first cavity has a first cavity length and the second cavity has a second cavity length, and wherein the first cavity length is greater than the second cavity length so that the first magnet is able to slide in the first cavity;
wherein, when the first cover is located at the first position, the frame cavity liner and the battery container are attached one another by magnetic force between the first magnet and the second magnet; and
wherein, when the first cover is located at the second position, the first magnet and the second magnet are arranged to face same polarities of one another for urging the battery container to be detached from the frame cavity liner.

6. The battery system assembly as claimed in claim 5, wherein the first cover has a first cover length and the frame cavity liner has a frame cavity liner length, wherein the first cover length is greater than the frame cavity liner length.

7. The battery system assembly as claimed in claim 6, wherein a cover difference value between the first cover length and the frame cavity liner length is equal to a cavity difference value between the first cavity length and the second cavity length.

8. The battery system assembly as claimed in claim 6, wherein the battery container assembly has a first side and a second side, wherein the first side of the battery container has the second cavity within which the second magnet is disposed and the second side has an opening to accommodate a rechargeable battery.

9. The battery system assembly as claimed in claim 8, wherein the battery container assembly further comprises a second cover disposed on the second side.

10. The battery system assembly as claimed in claim 6, wherein at least one of the first cover and the second cover has an roughened surface.

* * * * *